United States Patent [19]

Laimböck

[11] Patent Number: 5,012,642
[45] Date of Patent: May 7, 1991

[54] EXHAUST SYSTEM FOR TWO-STROKE CYCLE INTERNAL COMBUSTION ENGINES

[76] Inventor: Franz Laimböck, Waldsdorfberg 86, A-8051 Graz-Thal, Austria

[21] Appl. No.: 520,261

[22] Filed: May 8, 1990

[30] Foreign Application Priority Data

Jun. 1, 1989 [AT] Austria .................... 1331/89

[51] Int. Cl.⁵ .............................................. F01N 3/18
[52] U.S. Cl. ...................................... 60/299; 60/314; 422/176; 422/177
[58] Field of Search ......................... 60/299, 302, 314; 422/176, 177, 180

[56] References Cited

U.S. PATENT DOCUMENTS

| | | | |
|---|---|---|---|
| 3,948,046 | 4/1976 | Davidson | 60/299 |
| 4,195,063 | 3/1980 | Iwaoka | 422/180 |
| 4,206,177 | 6/1980 | Otsubo et al. | |
| 4,890,690 | 1/1990 | Fischer | 60/314 |

FOREIGN PATENT DOCUMENTS

| | | | |
|---|---|---|---|
| 32223 | 3/1978 | Japan | 60/302 |
| 118912 | 9/1979 | Japan | 60/299 |

*Primary Examiner*—Douglas Hart
*Attorney, Agent, or Firm*—Kurt Kelman

[57] ABSTRACT

An exhaust system for two-stroke cycle internal combustion engines comprises a diffuser, which is adapted to be connected to the internal combustion engine, a baffle, which is provided downstream of the diffuser, a catalytic converter, which is disposed between said diffuser and said baffle, and a diffuser discharge pipe, which extends in said diffuser and is much smaller in diameter than the largest diameter of the exhaust system. In order to ensure that the catalytic converter will be lighted off quickly and that the gas dynamics will not adversely be affected to an appreciable degree, the diffuser discharge pipe extends from a location adjacent to the exhaust gas outlet of the cylinder and the inlet of the diffuser to the catalytic converter and merges by means of a steep funnel into the catalytic converter.

5 Claims, 1 Drawing Sheet

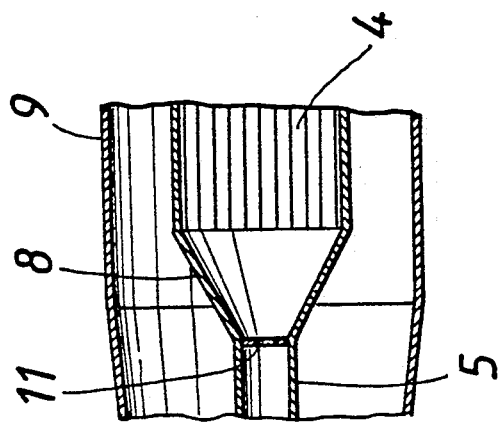
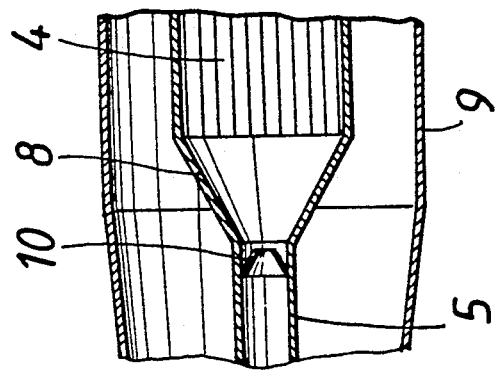
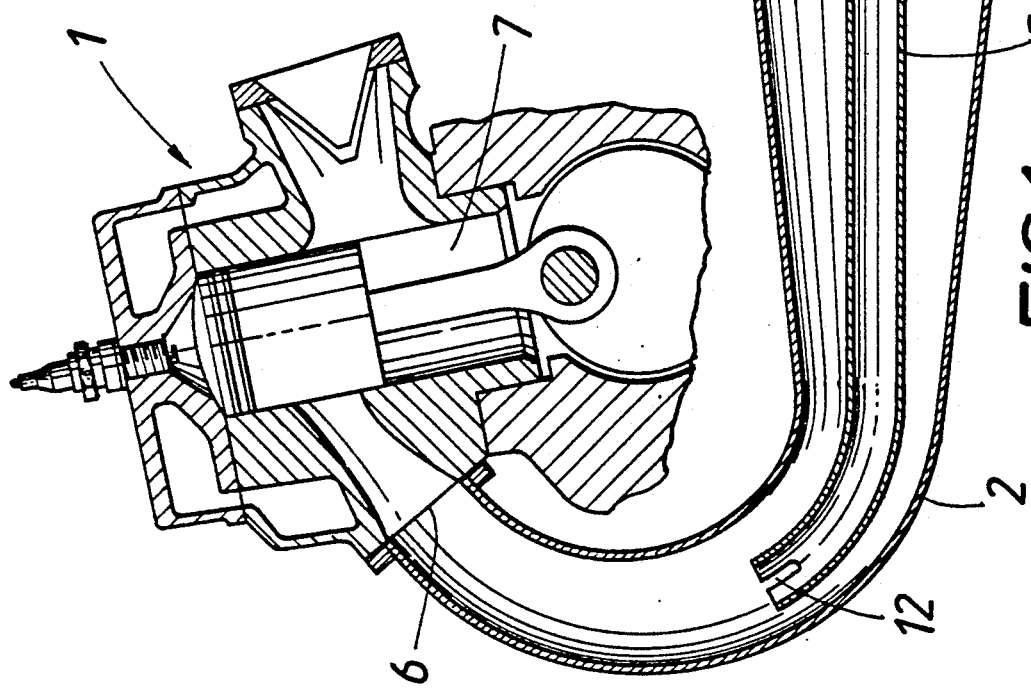

EXHAUST SYSTEM FOR TWO-STROKE CYCLE INTERNAL COMBUSTION ENGINES

BACKGROUND OF THE INVENTION

1. Field of the Invention

This invention relates to an exhaust system for two-stroke cycle internal combustion engines, which system comprises a diffuser, which is adapted to be connected to the internal combustion engine, a baffle, which is provided downstream of the diffuser, a catalytic converter, which is disposed between said diffuser and said baffle, and a diffuser discharge pipe, which extends in said diffuser and is much smaller in diameter than the largest diameter of the exhaust system.

2. Description of the Prior Art

The polluant contents of exhaust gases must meet certain legally prescribed requirements and are usually determined during a cycle of operations including a cold start and idling periods. Said requirements cannot be met unless the catalytic converter can be lighted off quickly. If the catalytic converter succeeds a diffuser, which is required to ensure the desired effects of gas dynamics, the catalytic converter will be spaced a large distance apart from th internal combustion engine in a region in which the temperatures of the exhaust gas are so low that the temperature at which the catalytic converter will be lighted off will be reached only a considerable time after the cycle of operations has been initiated. The baffle serves to reflect the pressure waves so that the change of the cylinder charge will be promoted.

In an exhaust system which is of the kind described first hereinbefore and has been disclosed in U.S. Pat. No. 4,206,177, the diffuser discharge pipe extends into the diffuser only over a relatively short distance and the catalytic converter is wound around the downstream end portion of said discharge pipe. As a result, the exhaust gases do not enter the catalytic converter through the diffuser discharge pipe but must flow radially through the catalytic converter into the discharge pipe. That arrangement will by no means ensure that the catalytic converter will be lighted off quickly.

SUMMARY OF THE INVENTION

It is an object of the invention to provide an exhaust system which is of the kind described first hereinbefore and which is so improved with simple means that the catalytic converter will be lighted off quickly whereas the gas dynamics will not adversely be affected.

That object is accomplished in accordance with the invention in that the diffuser discharge pipe extends from a location adjacent to the exhaust gas outlet of the cylinder and the inlet of the diffuser to the catalytic converter and merges by means of a steep funnel into the catalytic converter.

The entire stream of exhaust gas is conducted through the diffuser discharge pipe because that pipe extends into the entrance zone of the diffuser close to the exhaust gas outlet of the cylinder and the exhaust gas is still hot as it reaches the catalytic converter, which can thus be lighted off quickly. Because the cross-section of the diffuser discharge pipe is relatively small, the gas dynamics in the diffuser will hardly be adversely affected.

A throttle will suitably be provided at the outlet end of the diffuser discharge pipe adjacent to the inlet of the funnel so that the stream of exhaust gas in the funnel will be focused as in a welding torch and the lighting-off temperature will quickly be reached at a restricted spot on the upstream end face of the catalytic converter.

In order to promote the entrance of gas into the diffuser discharge pipe that pipe is formed in its entrance portion with apertures preferably consisting of longitudinal slots or may comprise a funnel-shaped entrance portion which tapers toward said outlet.

BRIEF DESCRIPTION OF THE DRAWING

FIG. 1 is a longitudinal sectional view showing those parts of an exhaust system in accordance with the invention which are essential for the invention.

FIGS. 2 and 3 are similar views showing portions of the exhaust gas system.

DETAILED DESCRIPTION OF THE PREFERRED EMBODIMENT

An illustrative embodiment of the invention will now be described more in detail with reference to the drawing.

A two-stroke cycle internal combustion engine 1 is succeeded by a tubular diffuser 2, which has an inlet end that is connected to an exhaust gas outlet of a cylinder of the engine 1 and an outlet end that is connected to a shell 9, which is equal in diameter to the outlet end of the diffuser 2, which flares in the direction from its inlet end to its outlet end. A tubular structure is connected to the shell 9 at its end that is opposite to the diffuser 2. The shell 9 contains a catalytic converter 4, which defines a first annular clearance space with said shell 9. A diffuser discharge pipe 5 extends in said diffuser 1 from a location which is close to the exhaust gas outlet of the cylinder and the inlet end of the diffuser 2. The diffuser discharge pipe 5 is much smaller in diameter than the shell 9 and is connected to the catalytic converter 4 at its upstream end by a steep funnel 8. A converter outlet pipe extends from the downstream end of the catalytic converter 4 through said tubular structure and defines a second annular clearance space therewith. An annular baffle 3 is provided, which is spaced from the catalytic converter 4 and surrounds said outlet pipe in said tubular structure and seals said second clearance space around said outlet pipe.

The diameter of the diffuser discharge pipe 5 is less than one-fourth of the diameter of the shell 9, which has the largest diameter of the exhaust system.

At the outlet of the diffuser discharge pipe 5 a throttle is provided adjacent to the inlet of the funnel 8. Said throttle may consist of a small nozzle 10, as is shown in FIG. 2, or of a simple orifice plate 11, as is shown in FIG. 3. The diffuser discharge pipe 5 may be formed in its entrance portion with longitudinal slots 12 or other apertures.

What is claimed:

1. In an exhaust system for connection to an exhaust gas outlet of a two-stroke cycle internal combustion engine, which exhaust system comprises a tubular diffuser having an inlet end and an outlet end and flaring in the direction from said inlet end to said outlet end and adapted to be connected at said inlet end to said exhaust gas outlet, a shell, which is connected to said diffuser at said outlet end and is equal in diameter to said outlet end, a tubular structure, which is connected to said shell at its end that is opposite to said diffuser, a catalytic converter, which is contained in said shell and has upstream and downstream ends and defines a first annular clearance space with said shell, a diffuser discharge pipe, which extends in said diffuser and is much smaller in diameter than said shell and is connected to said converter at its upstream end, a converter outlet pipe, which is connected to said converter at its downstream end and extends through said tubular structure and defines a second annular clearance space therewith, and an annular baffle, which is spaced from said converter and surrounds said outlet pipe in said tubular structure and seals said second clearance space around said outlet pipe, the improvement residing in that said discharge pipe has a discharge pipe inlet, which is close to said inlet end of said diffuser, and said discharge pipe has opposite to said discharge pipe inlet a discharge pipe outlet, which is connected by a steep funnel to said upstream end said converter.

2. The improvement set forth in claim 1, wherein a throttle is provided in said discharge pipe adjacent to said discharge pipe outlet.

3. The improvement set forth in claim 1, wherein said discharge pipe is formed with apertures adjacent to said discharge pipe inlet.

4. The improvement set forth in claim 3, wherein said apertures consist of slots extending along said discharge pipe.

5. The improvement set forth in claim 1, wherein said discharge pipe has adjacent to said discharge pipe inlet a funnel-shaped portion which tapers toward said outlet.

* * * * *